W. MURRAY.
Trimmings.

No. 137,858.

Patented April 15, 1873.

Witnesses:

Inventor:

UNITED STATES PATENT OFFICE.

WELWOOD MURRAY, OF NEW YORK, N. Y.

IMPROVEMENT IN TRIMMINGS.

Specification forming part of Letters Patent No. 137,858, dated April 15, 1873; application filed March 1, 1873.

CASE B.

*To all whom it may concern:*

Be it known that I, WELWOOD MURRAY, of the city, county, and State of New York, have invented a new and Improved Trimming, of which the following is a specification:

My invention consists of a new article of trimming for ladies' collars, cuffs, &c., which I propose to call collarette trimming, composed of a combination of a plaited ruching of net, whether known as illusion, Mechlin, bobbin, or Brussels net, with narrow plaited and pointed muslin, the net being placed on one side only, or on the front and back of the muslin, and sewed along the middle of the front piece and upper edge of the back piece, when a back piece is used, to the plain edge of the muslin, of which there may be one or two strips, one placed above the other when two are used, and made narrower than the bottom piece so that the points of the latter will not be covered, and the back piece of net will be wider than the widest strip of muslin so as to project below the points, thus making the said trimming of one or two rows of points, and with or without a margin of net projecting below the points; but more than two strips of each may be used in like manner, if preferred. I prefer to arrange the pointed strips of muslin so that the points of the upper one will coincide with the notches of the lower one; but this is not essential.

Figure 1:
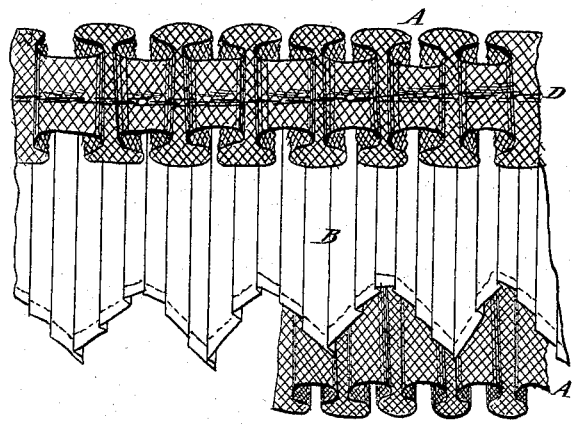
Figure 2:
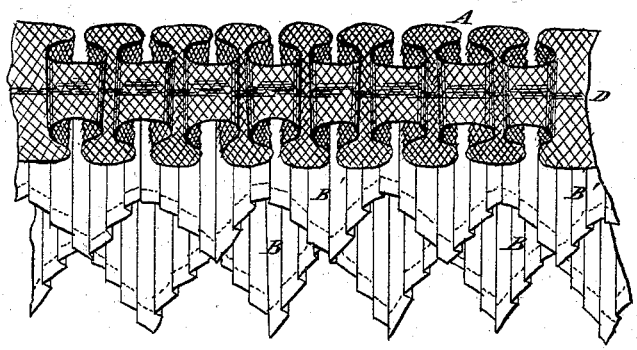

Figure 1 is a plan view of my improved trimming with one strip of plaited and pointed muslin, and in one part with only one strip of net, and in another part with two strips. Fig. 2 is a plan of a piece with two rows of points.

Similar letters of reference indicate corresponding parts.

A represents the front strip of plaited net. A' is the back strip. B and B' represent the strips of muslin. The net is box-plaited, but it may be side-plaited, if preferred. The muslin is box-plaited and pointed. They are sewed together along the line D, which is the middle of the front strip of net, and the top or plain edge of the strips B and B' of muslin, and the back strip A' of net, I may have plain.

The plaits of the net will not be folded down flat, except as they are drawn down by the seam along the middle, so that the edges will be puffed considerably above the plane of the strips B, and the under part A' will be puffed below the seam.

These two articles, thus combined, make a very elegant, light, puffy trimming for neck wear, of very stylish and dressy appearance, while being very cheap.

Having thus described my invention, I claim as new and desire to secure by Letters Patent—

As a new article of manufacture, the trimming composed of plaited ruching of net, whether known as illusion, Mechlin, bobbin, or Brussels net, combined with plaited and pointed muslin, substantially as described and represented in the drawing.

WELWOOD MURRAY.

Witnesses:
   T. B. MOSHER,
   ALEX. F. ROBERTS.